US011755468B2

(12) United States Patent
Battiato et al.

(10) Patent No.: US 11,755,468 B2
(45) Date of Patent: Sep. 12, 2023

(54) AUTOMATED GENERATION OF LOAD TESTS FOR API TESTING

(71) Applicant: salesforce.com, inc., San Francisco, CA (US)

(72) Inventors: Nicolas Battiato, Buenos Aires (AR); Diego Gabriel Larralde, Buenos Aires (AR); Guido Martinez, Buenos Aires (AR); Christian Vallejos, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 67 days.

(21) Appl. No.: 17/479,493

(22) Filed: Sep. 20, 2021

(65) Prior Publication Data

US 2023/0089336 A1   Mar. 23, 2023

(51) Int. Cl.
*G06F 11/36* (2006.01)
*G06F 11/32* (2006.01)
*G06F 11/30* (2006.01)
*G06F 11/34* (2006.01)

(52) U.S. Cl.
CPC ...... *G06F 11/3688* (2013.01); *G06F 11/3072* (2013.01); *G06F 11/324* (2013.01); *G06F 11/3414* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 9,189,369 | B1* | 11/2015 | Giardina | G06F 11/3688 |
| 10,977,167 | B2* | 4/2021 | Cheung | G06F 11/3688 |
| 2013/0174126 | A1* | 7/2013 | Belihomji | G06F 11/3668 |
| | | | | 717/127 |
| 2014/0075242 | A1* | 3/2014 | Dolinina | G06F 11/3672 |
| | | | | 714/E11.178 |
| 2020/0334134 | A1* | 10/2020 | Kalyanaraman | G06F 11/3688 |
| 2020/0401506 | A1* | 12/2020 | Sathianarayanan | G06F 9/54 |
| 2021/0240600 | A1* | 8/2021 | Larosa | G06F 11/3664 |
| 2022/0121562 | A1* | 4/2022 | Kumar | G06F 11/3696 |

* cited by examiner

*Primary Examiner* — Isaac Tuku Tecklu
(74) *Attorney, Agent, or Firm* — Sterne, Kessler, Goldstein & Fox P.L.L.C.

(57) ABSTRACT

Disclosed herein are system, method, and computer-readable medium embodiments for providing the ability to automate the process of generating load tests used for benchmarking APIs. Rather than having to manually generate load tests for a web service API, a test developer can interact with a test service through a web browser and provide the service an API specification and testing parameters. The test service can analyze the API specification, automatically identified endpoints of the API, and generate load tests according to the expected input/output structures of the endpoints. The automatic load test generation can proceed by referring to a library of test instructions and extracting the portions of the test instructions that work for the identified endpoints.

20 Claims, 4 Drawing Sheets

AUTOMATED GENERATION OF LOAD TESTS FOR API TESTING

BACKGROUND

Representational state transfer (REST) web services (or, RESTful web services) are services satisfying several core principles of REST, such as the use of stateless operations, client-server relationships, and unique identification of resources through a uniform resource identifier (URI). Commonly, requests to these RESTful web services are made through Hypertext Transfer Protocol (HTTP) requests, that include instructions such as GET (to read a resource at a URI), PUT (to update a resource at the URI), DELETE (to remove a resource at the URI), and POST (to create a new resource).

These services may be developed and implemented in conformance with the use of an Application Program Interface (API). The API defines how requests are made and answered by the service. Developers can generate APIs through the use of API specifications, which in the context of RESTful web services are often defined in languages such as RESTful API Modeling Language (RAML) or OpenAPI Specification (OAS).

An endpoint of an API is an access point (e.g., a URL) through which a user can interact with the API (e.g., input and output flows). An API can include one or more endpoints. It is of interest for API developers to make sure APIs behave reliably so as to provide users reliable interaction with the API. To check an API, a developer can conduct tests at the endpoint (e.g., "load" or "stress" tests).

Testing a RESTful web service API (REST API) is commonly handled by generating test suites, commonly with tools such as Apache JMeter, JUnit, or Blackbox API Tester (BAT). However, generating test suites with each of these tools requires manually defining test parameters and conditions.

Accordingly, what is needed are automated tools for testing REST APIs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
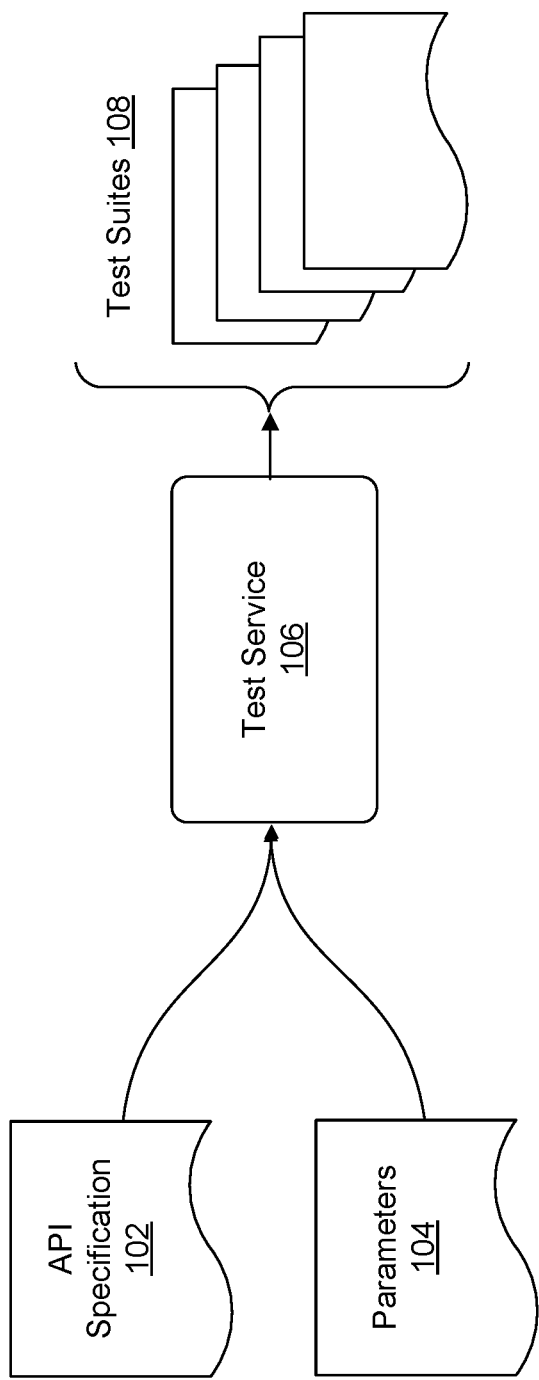
FIG. 1 shows a system for facilitating test suite generation, according to some embodiments.

Provided herein are system, apparatus, device, method and/or computer program product embodiments, and/or combinations and sub-combinations thereof, for rapid generation of test suites for verifying the operation of REST APIs.

In order to test REST APIs, a testing framework such as Apache JMeter (for example) may be used to write tests, as well as to compile multiple tests into a test suite. A testing framework allows for connection to a service, such as a RESTful web service, and the sending of requests to the service in order to receive a response. That response can then be tested against constraints to determine whether the response is or is not what was expected.

While REST API testing frameworks allow for robust implementation of tests and test suites, in some embodiments, a test developer is tasked with envisioning a plurality of testing scenarios and write the tests specific to a particular API. The developer is then tasked with drafting a test for each possible use case, specific for a particular API. And, if testing multiple APIs, this approach presents an exponentially complex problem for test development.

In some embodiments, APIs can be designed and generated through the use of an API specification, such as RAML or OAS by way of non-limiting example. A test developer can reference the API specification in order to determine which requests to make for testing purposes, and then apply certain constraints to the received responses in order to verify correct behavior. In some embodiments, a developer can implement a load test to see how an API might perform under high-traffic conditions. The terms "load test", "stress test", "performance test", "benchmarking", or the like, can be used herein to refer to tests for ascertaining how an API behaves under increased loads or extreme loads (e.g., for seeing how much activity an API can handle before the API crosses from stable to unreliable). And, while it can be appreciated that the processing power of the computing systems running the API have some influence over API performance, inefficient programming can also impact API reliability under increased loads. Load testing can offer a developer valuable information for improving the API code.

In one scenario, according to some embodiments, a developer can have an early version of an API completed. At this stage of development, it can be appreciated that not many tests, if any, have been performed on the completed API. Therefore, despite the developer being the "creator" of the API, it may not be readily apparent to the developer which aspects of the API have a higher risk of malfunctioning or becoming unstable when the API is deployed for consumer use. In one example, such instability information can be gained by deploying the API and relying on user-feedback to guide the debugging/correction process. However, presenting a non-optimized product to customers is undesirable.

In some embodiments, to avoid a detrimental customer experience, the developer can instead perform their own test processes. For example, the developer, having knowledge of their own API, can analyze the API specification to make an educated guess on which types of load tests to create and how to execute them. The developer can generate one or more tests (e.g., a ping, simulation scenarios, or the like) to ascertain whether one or more operations of an API are working properly. It is to be appreciated that the above-described scenario demonstrates a "manual" load test generation. In contrast, embodiments disclosed herein provide modules and functions automating certain tasks in the generation of load tests to reduce a burden on the developer—this can be referred to as "automated" load test generation.

FIG. 1 shows a system 100 for facilitating automated load test generation, according to some embodiments. In some embodiments, system 100 can accept, as inputs, an API specification 102 and parameters 104. A user can make the inputs by using, for example, a user interface. The user interface can be a graphical user interface (e.g., a web browser), a command-line interface (CLI), or the like. User interface 102 can interact with one or more services (e.g., a REST API, test service 106, or the like). System 100 can be implemented using one or more computing devices (e.g., a personal computer, a mobile device, a server, or the like).

In some embodiments, system 100 can comprise a test service 106. A developer can send the API specification 102 and parameters 104 to test service 106. API specification 102 can comprise, for example, architecture of the API (metadata can also be included). Parameters 104 can comprise, for example, information for delineating a scope of a load test. In one non-limiting example, parameters 104 can comprise domain-specific language (DSL) setting conditions for a stress test on the API specified by API specification 102. Parameters 104 can comprise, for example, a number of parallel connections or users to simulate, the type of operation or request coming from each simulated connection, a frequency and/or number of repetition of each operation, a time duration for the load test(s), a set of conditions for triggering another operation, and the like.

In some embodiments, test service 106 can analyze API specification 102 and parameters 104. Based on the analysis, test service 106 can generate (or prepare to generate) one or more executable load tests (e.g., tests), which are represented as test suites 108. The API can have one or more endpoints. Therefore, test service 106 can generate one or more tests for the one or more endpoints. Test service 106 can generate all possible tests for all possible endpoints or a smaller selection therefrom. The smaller selection can be specified by the user by, for example, with appropriate entries in parameters 104. Alternatively, or additionally, in a preparatory stage of generating the tests, test service 106 can wait for user selection before proceeding to generate a specific subset of tests from the suite of possible tests. In this manner, test service 106 can perform automated load test generation. The generated health check(s) 108 can then be saved (and modified as needed) for testing the API at a future time.

Figure 2:
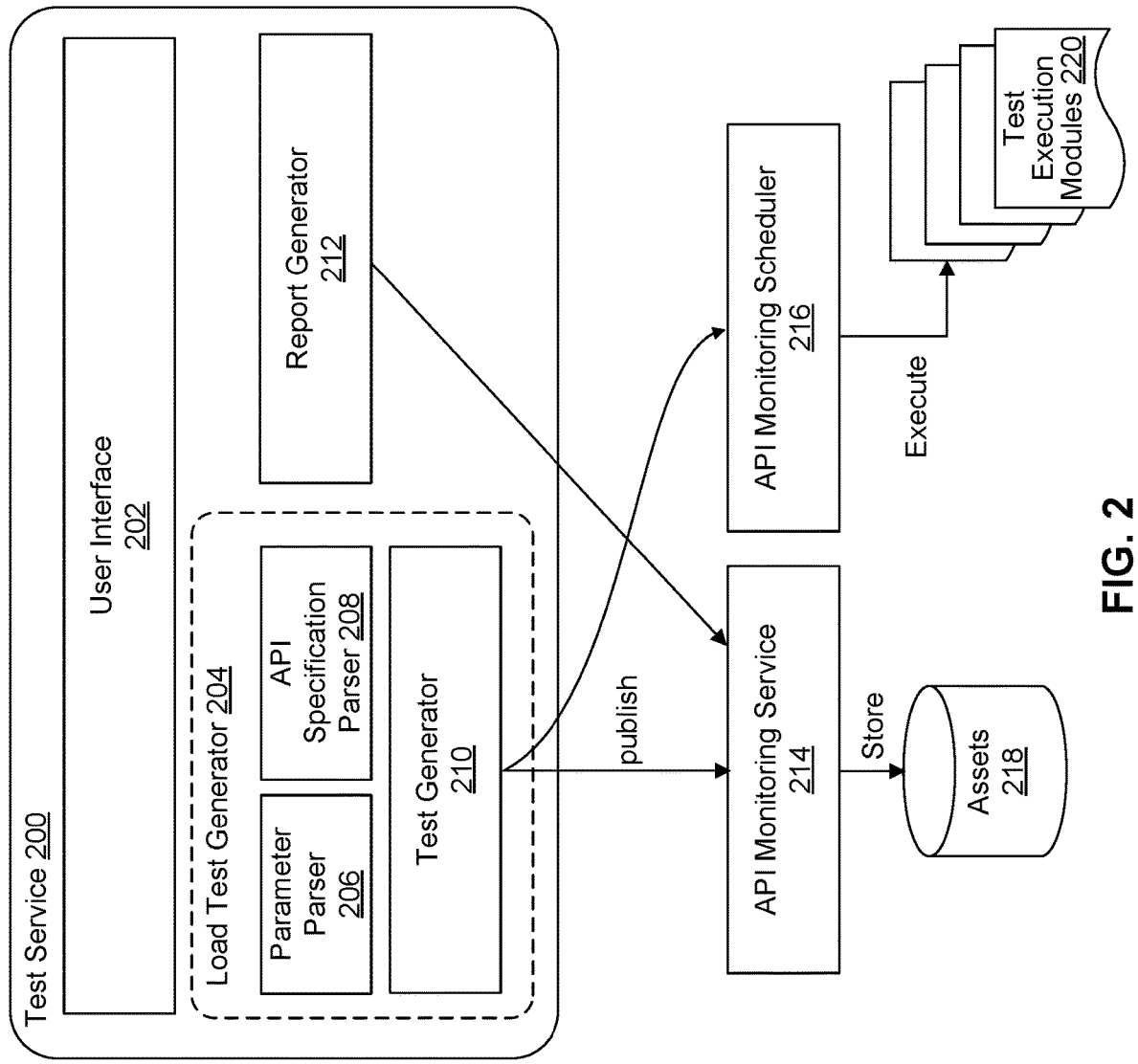
FIG. 2 shows a test service, according to some embodiments.

FIG. 2 shows a test service 200, according to some embodiments. In some embodiments, test service 200 can be implemented as test service 106 in FIG. 1.

Figure 3:
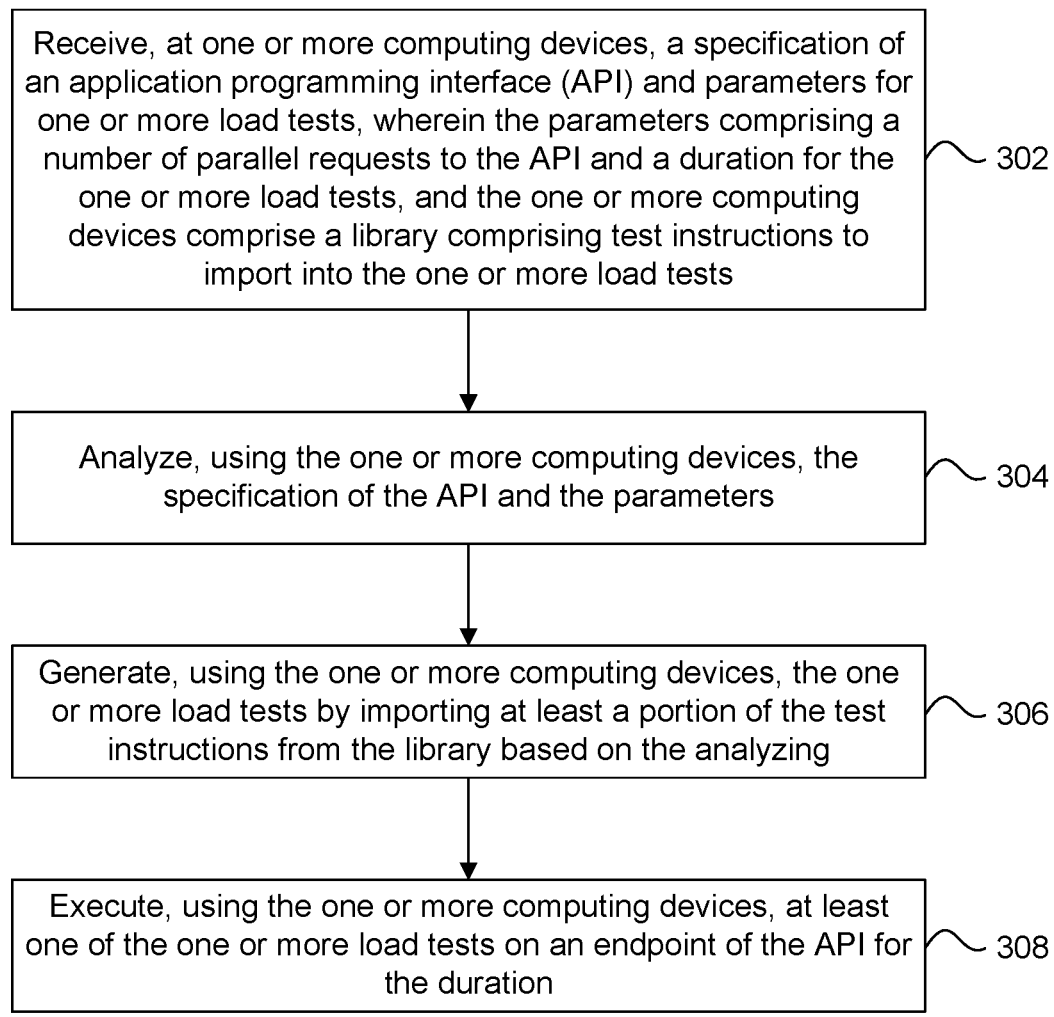
FIG. 3 shows a flowchart of a method, according to some embodiments.

In some embodiments, test service 200 can comprise a module to provide a user interface 202 and a load test generator 204. Load test generator 204 can comprise tools and instructions for analyzing an API specification and parameters (e.g., API specification 102 and parameters 104 (FIG. 1). For example, load test generator 204 can comprise a parameter parser 206, an API specification parser 208, and a test code generator 210. It is to be appreciated that FIG. 2 shows a non-limiting example of modularization of test service 200 configured to perform the methods described herein, such as that illustrated in flowchart 300 (FIG. 3).

In some embodiments, test service 200 can receive an API specification 102 and parameters 104 (FIG. 1). The parameters can be parsed through parser 206. The API specification can be parsed through parser 208. The parsed information is subsequently analyzed by load test generator 204. Based on the analysis, Test code generator 210 can build tests for the API corresponding to API specification 102 (FIG. 1). Test code generator 210 can be implemented so as to have access to a library of code corresponding to different types of functional tests that can be performed on API specifications input into test service 200. In one example, the load test library can comprise instruction code spanning a comprehensive set of tests for APIs in a specific type of market (e.g., a comprehensive set of tests for online shopping cart APIs). Test code generator 210 can generate one or more load tests by importing at least a portion of the instructions for load testing, from the library, based on the analysis of load test generator 204.

In some embodiments, an objective of load test generator 204 is to shift, onto itself, a burden from the user—that burden being the manual generation of the test case scenario and corresponding manual construction of the load test. For each endpoint defined in the API specification, one or more load tests can be generated. The generated one or more load tests can be based on the specification (e.g., API architecture, constraints, or the like) and the information found in the input parameters (e.g., number of parallel connections or users, use case to explore, load test duration, or the like). For example, a use case can be if an operation is carried out successfully. Another example use case can be on security (e.g., authentication).

In some embodiments, test generator 210 can generate one or more load tests based on analysis of the API specification. Test generator 210 can be a BAT test generator for generating code for blackbox automated testing. Generating load tests can be based on: (a) the endpoints API; (b) transformations applied to the endpoints; (c) the potential input and outputs and their structures; and/or (d) the potential transport responses (e.g., http response code)—to name a few non-limiting examples. In this context, transformation applied to an endpoint can refer to anything that changes, directly or indirectly, the behavior at the endpoint (e.g., authentication, rate limiting, or the like). In some embodiments, when test generator 210 selects portions of the load test library to use for generating load tests, the selection can be based on at least the above-noted factors identified by the analysis of the API specification.

In some embodiments, generating one or more load tests can be performed as follows (not all steps need be performed). Analyze input and output structures. Analyze defined transport responses. Analyze transformation(s) applied at endpoint(s) of the API. Analyze parameters 104 (FIG. 1). Identify each possible use case for which a test can be generated based on the potential input/output variations at the endpoint(s). Apply security transformation to the relevant use cases identified (if any). Analyze further scenario constraints from parameters 104 (FIG. 1), for example, user specified "happy path" (e.g., all the endpoints are expected to return a success output), invalid input and/or output, security attach, or the like. Generate tests by importing test instructions from the load test library, the test instructions corresponding to the use cases identified and the constraints of the generated test being based on information in parameters 104 (FIG. 1).

In some embodiments, test service 200 can execute the generated load tests (e.g., as a first test run). For this purpose, test service 200 can setup a running instance of the API (originally received by test service 200 as the input API specification) and then execute the generated tests on the endpoints of the API. The generated load tests can be executed based on a user-specified duration. Test service 200 can comprise a report generator 212 to save logs and/or communicate results from the executed load tests (e.g., metadata). For example, logged metadata can include, without limitation, identification of the user that requested the execution of the load test(s), the results of the load test(s), the endpoint(s) tested, or the like. The logged data can be used by developers to enhance APIs at later development stages and/or enhance analyzer test service 200.

In some embodiments, one or more computing devices used for implementing test service 200 can send an alert at a conclusion of executed load test(s) (e.g., to alert a developer to check on the results). Additional metadata (e.g., as described above) may be sent along with the alert so as to inform a developer of the results of the load test(s).

In some embodiments, by providing test service 200 with the capability to generate load tests from the input API specification, a skeleton of the load test(s) can be generated as easily as browsing a website. Whereas previously a test developer would have had to envision failure modes of the API in order to manually create those test cases, the test developer (or other users) can use user interface 202 (e.g., a RESTful web service) as a normal user and put the web site through its paces with a few simple inputs. In interacting with the web site as a normal user, the test developer can rapidly prepare load tests for the API being developed.

In some embodiments, test service 200 can transmit (e.g., publish) the generated load tests and/or test results to an API monitoring service 214 (e.g., Mulesoft's Anypoint Platform™). API monitoring service 214 can store the generated load tests and/or test results as assets 218 for use by other developers/users of API monitoring service 214. API monitoring service 214 can be implemented along with an API monitoring scheduler 216 that can schedule for execution one or more of the load tests generated by test service 200. For example, a user can set time schedule for execution. The time schedule can specify when the generated one or more load tests are to be executed (e.g., once, multiple times, on a periodic schedule, or the like). At time of execution, the scheduler prompts test execution modules 220 to begin load testing. A test execution module can refer to an entity that can receive the test instructions and execute those instructions (e.g., a computing device with appropriate software). The metadata generated by executing scheduled load tests can also be saved and appended to assets 218. API monitoring service 214 can send an alert at a conclusion of executed load test(s).

Figure 4:
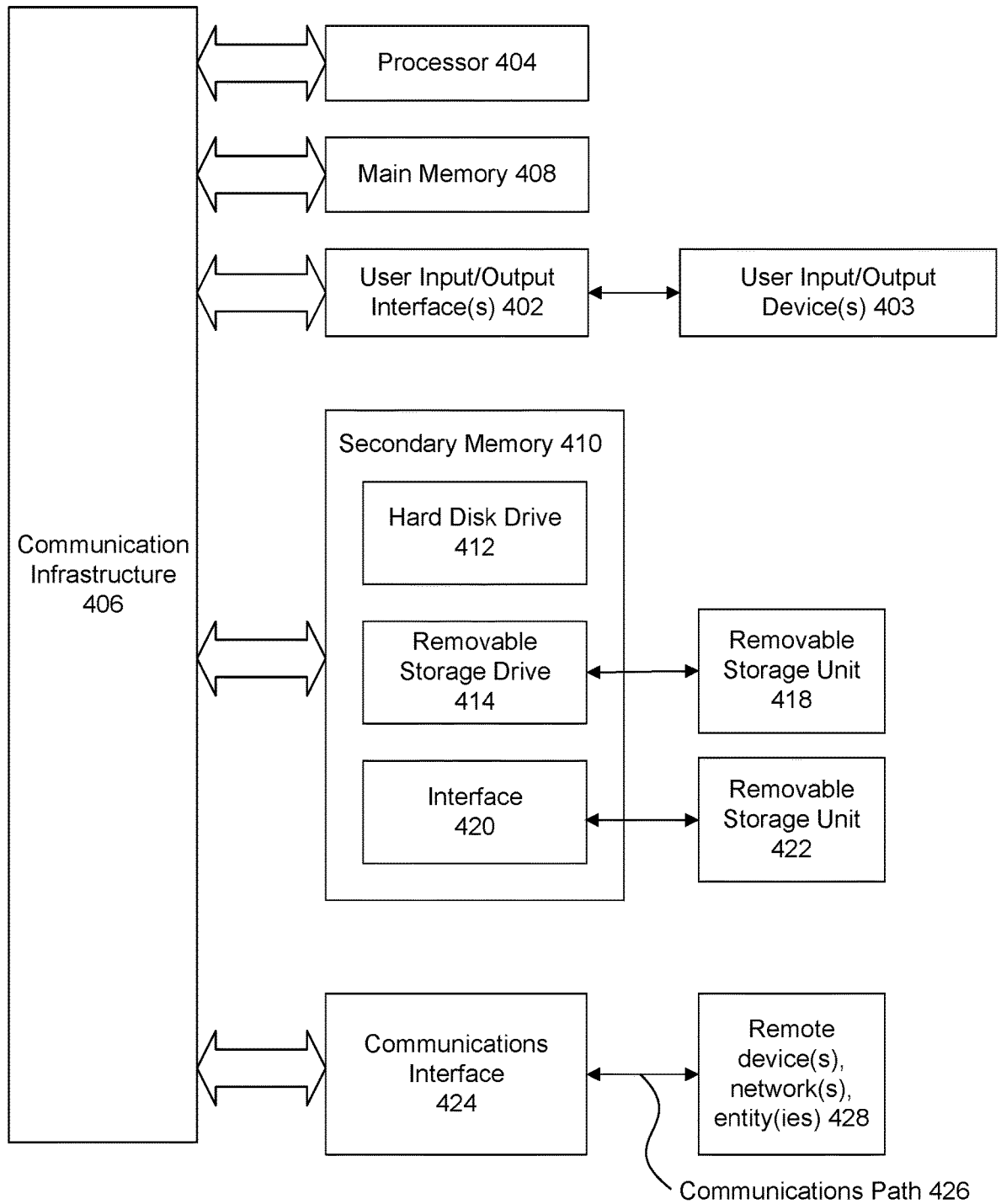
FIG. 4 shows an example computer system useful for implementing various embodiments.

FIG. 3 shows a method 300 for performing functions as described in reference to FIGS. 1, 2, and 4, according to some embodiments. At step 302, a specification of an API and parameters for one or more load tests can be received at one or more computing devices. The parameters can comprise a number of parallel requests to the API and a duration for the one or more load tests. The one or more computing devices can comprise a library comprising test instruction to import into the one or more load tests. At step 304, the specification of the API and the parameters are analyzed using the one or more computing devices. At step 306, the one or more load tests are generated using the one or more computing devices by importing at least a portion of the test instructions from the library based on the analyzing. At step 308, at least one of the one or more load tests are executed on an endpoint of the API for the duration.

The method steps of FIG. 3 can be performed in any conceivable order and it is not required that all steps be performed. Moreover, the method steps of FIG. 3 described above merely reflect an example of steps and are not limiting. It is to be appreciated that further method steps for method 300 are envisaged based upon functions described in embodiments referencing FIGS. 1, 2, and 4.

Various embodiments can be implemented, for example, using one or more well-known computer systems, such as computer system 400 shown in FIG. 4. One or more computer systems 400 can be used, for example, to implement any of the embodiments discussed herein, as well as combinations and sub-combinations thereof.

Computer system 400 can include one or more processors (also called central processing units, or CPUs), such as a processor 404. Processor 404 can be connected to a communication infrastructure or bus 406.

Computer system 400 can also include customer input/output device(s) 403, such as monitors, keyboards, pointing devices, etc., which can communicate with communication infrastructure 406 through customer input/output interface(s) 402.

One or more of processors 404 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 can also include a main or primary memory 408, such as random access memory (RAM). Main memory 408 can include one or more levels of cache. Main memory 408 can have stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 can include a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 can read from and/or write to removable storage unit 418.

Secondary memory 410 can include other means, devices, components, instrumentalities or other approaches for allowing computer programs and/or other instructions and/or data to be accessed by computer system 400. Such means, devices, components, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 can enable computer system 400 to communicate and interact with any combination of external devices, external networks, external entities, etc. (individually and collectively referenced by reference number 428). For example, communication interface 424 can allow computer system 400 to communicate with external or remote devices 428 over communications path 426, which can be wired and/or wireless (or a combination thereof), and which can include any combination of LANs, WANs, the Internet, etc. Control logic and/or data can be transmitted to and from computer system 400 via communication path 426.

Computer system 400 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
   receiving, by one or more computing devices, a specification of an application programming interface (API) and parameters for one or more load tests, wherein:
      the parameters comprise a number of parallel requests to the API and a duration for the one or more load tests, and
      the one or more computing devices comprise a library comprising test instructions;
   analyzing, by the one or more computing devices, the specification of the API and the parameters;
   generating, by the one or more computing devices, a load test by importing at least a portion of the test instructions from the library based on the analyzing; and
   executing, by the one or more computing devices, the load test on an endpoint of the API for the duration.

2. The computer-implemented method of claim 1, wherein the generating comprises generating the load test based on factors determined by the analyzing, the factors comprising:
   one or more endpoints of the API;
   transformations applied to the one or more endpoints;
   potential inputs and outputs at the one or more endpoints; and/or
   potential transport responses at the one or more endpoints.

3. The computer-implemented method of claim 1, further comprising generating, by the one or more computing devices, a report based on the results of the executed load test.

4. The computer-implemented method of claim 1, further comprising publishing, by the one or more computing devices, the generated load test on an API monitoring service.

5. The computer-implemented method of claim 1, further comprising scheduling, by an API monitoring scheduler, the load test based on a time schedule.

6. The computer-implemented method of claim 5, further comprising executing the scheduled load test based on the time schedule.

7. The computer-implemented method of claim 6, further comprising logging information relating to the executing the scheduled load test.

8. The computer-implemented method of claim 6, further comprising sending an alert indicating a completion of the executing the scheduled load test.

9. A non-transitory computer-readable medium having instructions stored thereon that, when executed by one or more computing devices, cause the one or more computing devices to perform operations comprising:
- receiving a specification of an application programming interface (API) and parameters for one or more load tests, wherein:
  - the parameters comprise a number of parallel requests to the API and a duration for the one or more load tests, and
  - the one or more computing devices comprise a library comprising test instructions;
- analyzing the specification of the API and the parameters;
- generating a load test by importing at least a portion of the test instructions from the library based on the analyzing; and
- executing the load test on an endpoint of the API for the duration.

10. The non-transitory computer-readable medium of claim 9, wherein the generating comprises generating the load test based on factors determined by the analyzing, the factors comprising:
- one or more endpoints of the API;
- transformations applied to the one or more endpoints;
- potential inputs and outputs at the one or more endpoints; and/or
- potential transport responses at the one or more endpoints.

11. The non-transitory computer-readable medium of claim 9, wherein the operations further comprise generating a report based on the results of the executed load test.

12. The non-transitory computer-readable medium of claim 9, wherein the operations further comprise publishing the generated load test on an API monitoring service.

13. The non-transitory computer-readable medium of claim 9, wherein the operations further comprise scheduling, by an API monitoring scheduler, the load test based on a time schedule.

14. The non-transitory computer-readable medium of claim 13, wherein the operations further comprise executing the scheduled load test based on the time schedule.

15. The non-transitory computer-readable medium of claim 13, wherein the operations further comprise logging information relating to the executing the scheduled load test.

16. The non-transitory computer-readable medium of claim 13, wherein the operations further comprise sending an alert indicating a completion of the executing the scheduled load test.

17. A system comprising:
- one or more computing devices; and
- a non-transitory computer-readable medium having instructions stored thereon that, when executed by the one or more computing devices, cause the one or more computing devices to perform operations comprising:
  - receiving a specification of an application programming interface (API) and parameters for one or more load tests, wherein:
    - the parameters comprise a number of parallel requests to the API and a duration for the one or more load tests, and
    - the one or more computing devices comprise a library comprising test instructions;
  - analyzing the specification of the API and the parameters;
  - generating a load test by importing at least a portion of the test instructions from the library based on the analyzing; and
  - executing the load test on an endpoint of the API for the duration.

18. The system of claim 17, wherein the generating comprises generating the load test based on factors determined by the analyzing, the factors comprising:
- one or more endpoints of the API;
- transformations applied to the one or more endpoints;
- potential inputs and outputs at the one or more endpoints; and/or
- potential transport responses at the one or more endpoints.

19. The system of claim 17, wherein the operations further comprise a report based on the results of the executed load test.

20. The system of claim 17, wherein the operations further comprise scheduling, by an API monitoring scheduler, the load test based on a time schedule.

* * * * *